(12) United States Patent
Roberts et al.

(10) Patent No.: US 11,820,335 B1
(45) Date of Patent: Nov. 21, 2023

(54) WINDSHIELD WIPER SCRUBBING DEVICE

(71) Applicants: Barry Roberts, Tampa, FL (US);
Davin Kinsler, Ocala, FL (US)

(72) Inventors: Barry Roberts, Tampa, FL (US);
Davin Kinsler, Ocala, FL (US)

( * ) Notice: Subject to any disclaimer, the term of this patent is extended or adjusted under 35 U.S.C. 154(b) by 0 days.

(21) Appl. No.: 17/742,381

(22) Filed: May 11, 2022

Related U.S. Application Data

(60) Provisional application No. 63/211,871, filed on Jun. 17, 2021, provisional application No. 63/187,234, filed on May 11, 2021.

(51) Int. Cl.
*B60S 1/38* (2006.01)
*B60S 1/36* (2006.01)
*B60S 1/34* (2006.01)

(52) U.S. Cl.
CPC .............. *B60S 1/38* (2013.01); *B60S 1/3486* (2013.01); *B60S 1/36* (2013.01); *B60S 1/365* (2013.01); *B60S 2001/3822* (2013.01); *B60S 2001/3831* (2013.01); *B60S 2001/3834* (2013.01); *B60S 2001/3837* (2013.01)

(58) Field of Classification Search
CPC .......... B60S 1/3486; B60S 1/36; B60S 1/365; B60S 1/38; B60S 2001/3824; B60S 2001/3831; B60S 2001/3834; B60S 2001/3832; B60S 2001/3838
USPC .............................. 15/250.21, 250.23, 250.41
See application file for complete search history.

(56) References Cited

U.S. PATENT DOCUMENTS

| | | | |
|---|---|---|---|
| 4,672,708 A | 6/1987 | Williams | |
| 5,168,595 A | 12/1992 | Naylor, Jr. | |
| 5,235,710 A | 8/1993 | Kinder | |
| 5,301,384 A | 4/1994 | Perry | |
| 5,406,672 A | 4/1995 | Hipke | |
| 5,442,834 A | 8/1995 | Perry | |
| 6,279,193 B1 | 8/2001 | Cheng | |
| 6,763,546 B1 | 7/2004 | Smith | |
| 7,596,828 B2 | 10/2009 | Evdokimo | |
| 7,707,681 B1 | 5/2010 | Cabak | |

(Continued)

FOREIGN PATENT DOCUMENTS

FR 2985700 A1 7/2013
WO 80/01155 6/1980

OTHER PUBLICATIONS

De La Pena Razquin; US2006/0000044A1; Non-Final Office Action dated Aug. 8, 2006.

*Primary Examiner* — Gary K. Graham
(74) *Attorney, Agent, or Firm* — John Rizvi; John Rizvi, P.A.—The Patent Professor®

(57) ABSTRACT

A windshield wiper scrubbing device for cleaning a windshield is disclosed. The windshield wiper scrubbing device comprises an arm comprising a top side and a bottom side. The arm moves in a first and second vertical direction. The bottom side of the arm comprises a scrubbing rod that moves in a first and second horizontal direction. A liquid canister releases cleaning solution onto the windshield upon a first actuation of a switch. A scrubbing pad located on the scrubbing rod is placed onto the windshield through a first rotation in a first rotational direction after the windshield receives the cleaning solution. A scraper located on the bottom side of the arm is placed onto the windshield through a second rotation in a second rotational direction upon a second actuation of the switch. A motor powers the scrubbing rod and rotates in the first rotational direction and the second rotational direction.

30 Claims, 18 Drawing Sheets

(56) References Cited

U.S. PATENT DOCUMENTS

| | | |
|---|---|---|
| 8,332,990 B2 | 12/2012 | Cooper |
| 8,715,421 B2 | 5/2014 | Nelson |
| 8,745,814 B2 | 6/2014 | Nelson |
| 10,065,605 B1 | 9/2018 | Petrowski et al. |
| 10,479,326 B2 | 11/2019 | LoSacco |
| 2006/0000044 A1 | 1/2006 | de La Pena Razquin |
| 2006/0064839 A1 | 3/2006 | Stouder, II |
| 2007/0017055 A1 | 1/2007 | Simko |
| 2008/0178408 A1 | 7/2008 | King |
| 2015/0224965 A1 | 8/2015 | Petrowski |
| 2016/0031419 A1 | 2/2016 | Nelson |

WINDSHIELD WIPER SCRUBBING DEVICE

CROSS-REFERENCE TO RELATED APPLICATIONS

This application claims the benefit of U.S. Provisional Patent Application No. 63/187,234 filed on May 11, 2021, which is incorporated herein by reference in its entirety; and U.S. Provisional Patent Application No. 63/211,871 filed on Jun. 17, 2021, which is incorporated herein by reference in its entirety.

FIELD OF THE INVENTION

The present invention relates generally to windshield wipers, and more particularly, to a windshield wiper device having a scrubbing rod and motor that may rotate both horizontally and vertically in order to clean a windshield of a vehicle.

BACKGROUND OF THE INVENTION

Windshield wipers, also known as windscreen wipers or car wipers, are used to remove rain, snow, ice, washer fluid, water, or debris from a vehicle's front window, in order for a driver of the vehicle to see the road. Vehicles using windshield wipers may comprise cars, trucks, buses, trains, watercraft, and aircraft. Headlights located on vehicles may also use windshield wipers.

Conventional windshield wipers typically comprise at least one arm. The at least one arm of conventional windshield wipers may comprise a first end that may pivot and a second end that may comprise a rubber blade. The at least one arm can be powered by a motor, wherein the motor that may power the at least one arm may comprise electric motors, motors using pneumatic power, variations thereof, or combinations thereof. The motor may use a worm gear to increase a torque of the motor and reduce an output speed of the motor. The worm gear may operate a linking system that may move the at least one arm of conventional windshield wipers.

When the at least one arm of conventional windshield wipers may be powered by the motor, the rubber blade may clear liquids from the windshield of the vehicle. However, as the rubber blade ages, nicks or cracks in the wiper blade may form. Operating the rubber blade with nicks or cracks may cause streaks to form on the windshield, which may reduce visibility of the windshield. Streaks may also be formed on the windshield if snow or ice can form on the at least one arm of conventional windshield wipers, because the snow or ice may unevenly distribute pressure to the least one arm of conventional windshield wipers. Accordingly, some conventional windshield wipers may have a winter blade that can have rubber covering the at least one arm.

Ideally, it would be extremely useful to be able to attach a winter blade to a windshield wiper and to have a windshield wiper with both a rubber blade and a winter blade. It would also be extremely useful to maximize a range of motion of a windshield wiper, in order to maximize visibility through the windshield and prevent streaks from forming on the windshield. However, winter blades may not be available, may be in limited supply, and must be assembled to conventional windshield wipers separately.

Conventional windshield wipers may also not fully clean an area of the windshield, because they may only clean the windshield along sagittal planes, transverse planes, or combinations thereof. Portions of the windshield that may be cleaned by manually scrubbing the windshield in a circular direction may not be reached by conventional windshield wipers.

Accordingly, there is need for a solution to at least one of the aforementioned problems. For instance, there is an established need for a windshield wiper that can clean the complete surface area of a windshield through circular rotation. There is also an established need for a windshield wiper that can switch between using a rubber blade and a winter blade.

SUMMARY OF THE INVENTION

The present invention is directed to a windshield wiper scrubbing device for cleaning a windshield on any suitable vehicle, including but not limited to automobiles, trucks, tractors, boats or the like. The windshield wiper scrubbing device may comprise an arm that may comprise a top side or section and a bottom side or section. The arm can move in a first vertical direction and a second vertical direction. The bottom side or section of the arm may comprise a scrubbing rod. The scrubbing rod can move in a first horizontal direction and a second horizontal direction through a second motor (also referred to as a secondary motor) and gears. A switch can release cleaning solution from a liquid canister (also referred to as "water/fluid reservoir") onto the windshield and may comprise a first actuation of the switch. A scrubbing pad may be located on the scrubbing rod. A first rotation in a first rotational direction may place the scrubbing pad on the windshield after the windshield may receive the cleaning solution from the liquid canister. The scrubbing pad can be placed onto the windshield in a first position through the first rotation. A scraper may be located on the bottom side or section of the arm. A second rotation in a second rotational direction may place the scraper onto the windshield after the switch can receive a second actuation. The scraper can be placed onto the windshield in a second position through the second rotation. A first motor (also referred to as a primary motor) may power the scrubbing rod. The first motor may rotate in the first rotational direction and may place the scrubbing pad onto the windshield in the first position. The first motor may rotate in the second rotational direction and may place the scraper onto the windshield in the second position.

In a first implementation of the invention, joints may removably connect the top section of the arm and the bottom section of the arm.

In another aspect of the invention, washers may be located on the bottom section of the arm and may secure the joints to the bottom section of the arm.

In another aspect, the first vertical direction may be upward.

In another aspect, the first vertical direction may be downward.

In another aspect, the second vertical direction may be upward.

In another aspect, the second vertical direction may be downward.

In another aspect, a user may turn on the windshield wiper scrubbing device in order to move the arm in the first vertical direction and the second vertical direction.

In another aspect, the windshield wiper scrubbing device may be turned on by depressing a button in the vehicle.

In another aspect, the windshield wiper scrubbing device may be turned on by turning a knob in the vehicle in a first direction.

In another aspect, the first direction to turn the knob in the vehicle may be upward.

In another aspect, the first direction to turn the knob in the vehicle may be downward.

In another aspect, the scrubbing rod may comprise the scrubbing pad, a first edge, a second edge, the scraper and the first motor (also referred to as the primary motor).

In another aspect, the scraper may comprise a back face and a front face.

In another aspect, a cord may join the back face of the scraper to the scrubbing rod.

In another aspect, the front face of the scraper may comprise a protrusion that may contact the windshield.

In another aspect, the protrusion of the front face of the scraper may have a shape comprising a four-pointed star, variations thereof, or combinations thereof.

In another aspect, the scrubbing pad may comprise bristles.

In another aspect, the bristles may scrub the windshield with the scrubbing pad.

In another aspect, the bristles of the scrubbing pad may be placed directly onto the windshield.

In another aspect, the scrubbing rod may be placed in a resting position by placing the first edge onto the windshield.

In another aspect, the second edge may be located on a top-leftmost end of the scrubbing rod and the scraper may be located on a top-rightmost end of the scrubbing rod.

In another aspect, the switch may be depressed in order to actuate the windshield washer scrubbing device.

In another aspect, the switch may comprise a remote controller.

In another aspect, the switch may comprise a button inside the vehicle that the user may push.

In another aspect, the switch may send a signal from a wireless transmitter to a wireless receiver.

In another aspect, the wireless receiver may receive the signal and can activate the delay switch module.

In another aspect, the delay control module may prevent the first motor from turning on and rotating until the windshield can receive the cleaning solution.

In another aspect, the delay control module may prevent a dual motor from turning on a first arm and a second arm.

In another aspect, the first arm may be located on a left side of the windshield and the second arm may be located on a right side of the windshield.

In another aspect, the first arm may be located on the right side of the windshield and the second arm may be located on the left side of the windshield.

In another aspect, the first motor may actuate after the liquid canister may dispense the cleaning solution and the delay control module may turn off.

In another aspect, the first edge of the scrubbing rod may contact the windshield at an angle comprising a range of up to 89°.

In another aspect, the second edge of the scrubbing rod may be positioned at the angle of the first edge.

In another aspect, the first rotational direction can be counterclockwise.

In another aspect, the first rotational direction can be clockwise.

In another aspect, the second rotational direction can be clockwise.

In another aspect, the second rotational direction can be counterclockwise.

In another aspect, the first rotational direction and the second rotational direction of the first or primary motor may rotate in the same direction.

In another aspect, the first edge and the second edge of the scrubbing rod may be elevated when the ice scraper is placed on the windshield.

In another aspect, upon activation of the first motor, a printed circuit board may electrically connect wires located on the first motor to a battery.

In another aspect, the battery may electrically power the first motor through the printed circuit board and the wires that may connect the first motor to the printed circuit board.

In another aspect, the battery may connect to a remote fixed power supply that may comprise an electrical outlet, a vehicle battery, combinations thereof, or variations thereof.

In another aspect, the battery may connect to a portable power supply that may comprise a vehicle battery charger, variations thereof, or combinations thereof.

In another aspect, the battery may be electrically powered by solar panels.

In another aspect, the solar panels may be placed on the top section of the arm of the windshield wiper scrubbing device.

In another aspect, the battery may be electrically wired to the scrubbing rod and may transfer heat to the scrubbing rod.

In another aspect, the heat that may be transferred to the scrubbing rod from the battery may increase a rate of removal of a semi-solid or solid substance found on the windshield of the vehicle.

In another aspect, the semi-solid or solid substance found on the windshield of the vehicle may comprise dirt, mud, ice, snow, variations thereof, or combinations thereof.

In another aspect, the solar panels may heat, power and recharge the battery.

In another aspect, the printed circuit board may electrically connect the battery to a slider.

In another aspect, the slider may comprise the second motor and the at least two gears.

In another aspect, the battery may electrically power the second motor through the printed circuit board and wires that may connect the second motor to the printed circuit board.

In another aspect, the first horizontal direction may be leftward.

In another aspect, the first horizontal direction may be rightward.

In another aspect, the second horizontal direction may be rightward.

In another aspect, the second horizontal direction may be leftward.

In another aspect, a first gear may rotate in a first gear rotational direction and a second gear may rotate in a second gear rotational direction in the second motor.

In another aspect the first gear rotational direction for the first gear may be counterclockwise and the second gear rotational direction for the second gear may be clockwise.

In another aspect, the first gear rotational direction for the first gear may be clockwise and the second gear rotational direction for the second gear may be counterclockwise.

In another aspect, the first gear that may rotate in the first gear rotational direction may move the slider in the first horizontal direction.

In another aspect, the second gear that may rotate in the second gear rotational direction may move the slider in the second horizontal direction.

In another aspect, the arm of the windshield wiper scrubbing device may move in the first vertical direction or the second vertical direction while the slider may move a leftmost end of the scrubbing rod and a rightmost end of the scrubbing rod in the first horizontal direction or the second horizontal direction.

In another aspect, the windshield wiper scrubbing device may clean the windshield and may have a shaped scrubbing pattern.

In another aspect, the shaped scrubbing pattern may be caused by simultaneous movement of the arm of the windshield wiper scrubbing device and the slider.

In another aspect, the shaped scrubbing pattern may comprise a circular shape, a semi-circular shape, variations thereof, or combinations thereof.

In another aspect, the slider and scrubbing rod may start in a stationary position.

In another aspect, when the second motor and the at least two gears are turned on by the battery, the slider and the scrubbing rod may move in the first horizontal direction or the second horizontal direction.

In another aspect, the user may power down the slider and the arm of the windshield wiper scrubbing device by turning off the windshield wiper scrubbing device.

In another aspect, the windshield wiper scrubbing device may be turned off by depressing the button in the vehicle.

In another aspect, the windshield wiper scrubbing device may be turned off by turning the knob located in the vehicle in a second direction.

In another aspect, the second direction to turn the knob located in the vehicle may be upward.

In another aspect, the second direction to turn the knob located in the vehicle may be downward.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
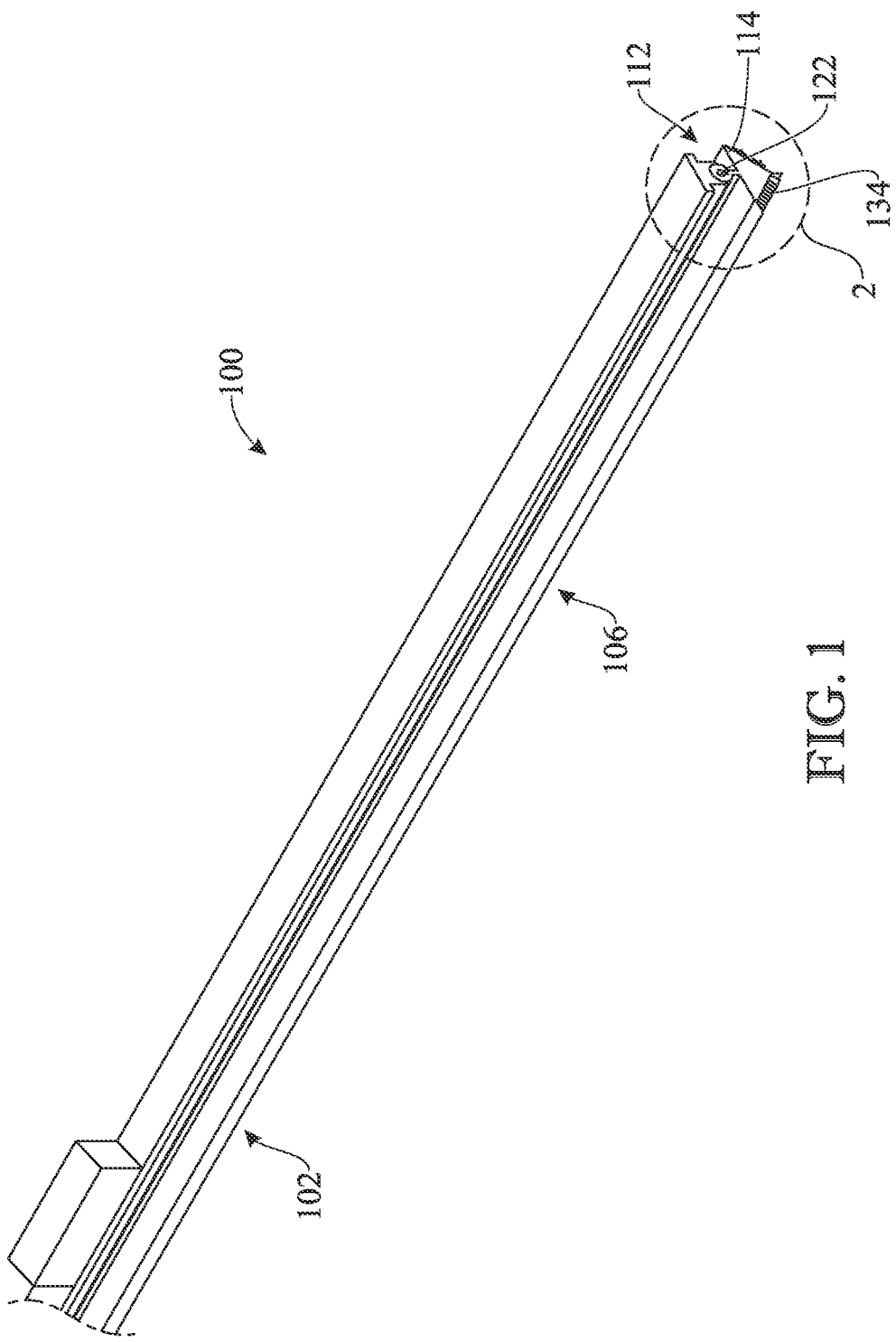
FIG. 1 presents a perspective view of the windshield wiper scrubbing device in accordance with a first illustrative embodiment of the present invention.
Figure 2:
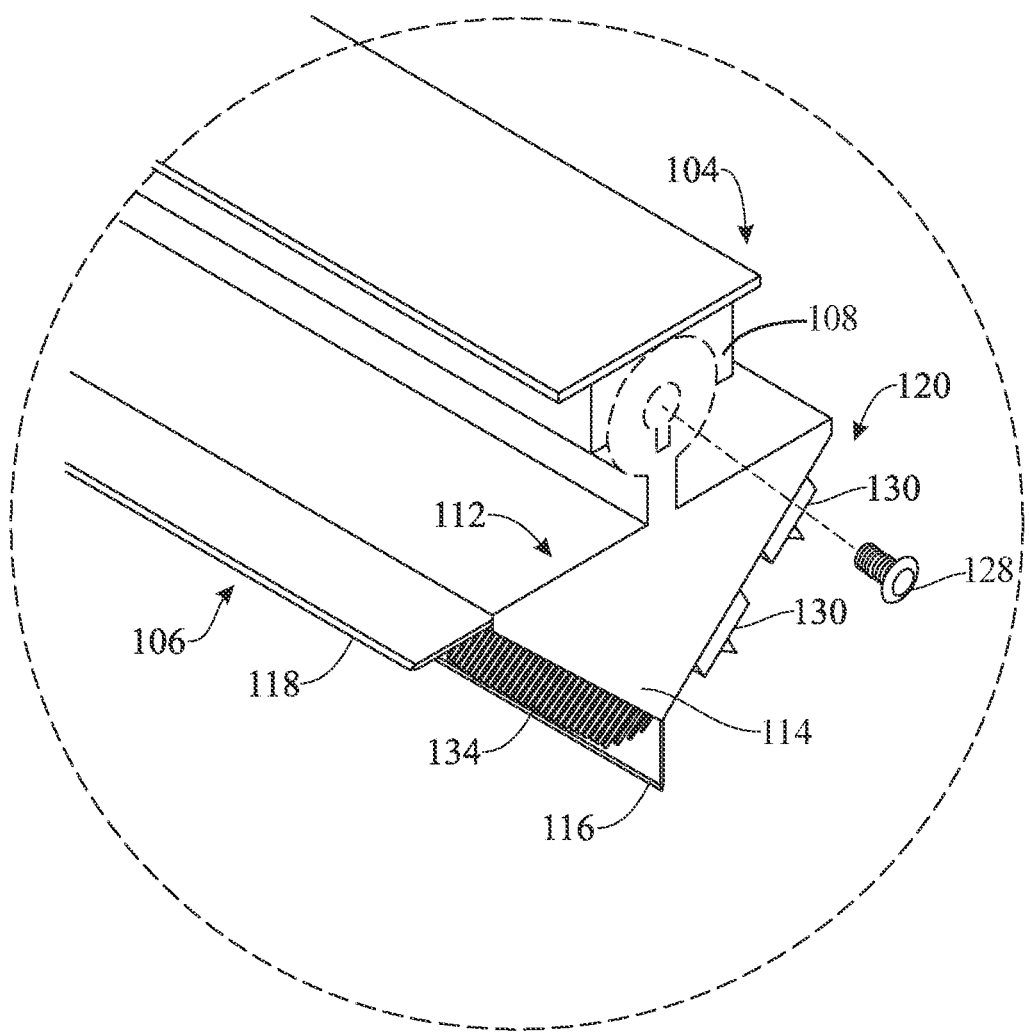
FIG. 2 presents a close-up view of a corner of the windshield wiper scrubbing device of FIG. 1.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to a windshield wiper device having a scrubbing rod and motor that may rotate both horizontally and vertically in order to clean a windshield of a vehicle.

Referring initially to FIGS. 1-12, a windshield wiper scrubbing device for a windshield, hereinafter windshield wiper scrubbing device 100, is illustrated in accordance with a first exemplary embodiment of the present invention. As shown for instance in FIG. 1, the windshield wiper scrubbing device 100 may comprise an arm 102. The windshield wiper scrubbing device may comprise at least one arm 102, and in some embodiments may comprise a plurality of arms.

The arm 102 may comprise a top section 104 and a bottom section 106. Joints 108 may removably connect the top section 104 of the arm 102 and the bottom section 106 of the arm 102. Washers 110 may be located on the bottom section 106 of the arm 102 and may secure the joints 108 to the bottom section 106 of the arm 102.

Figure 11A:
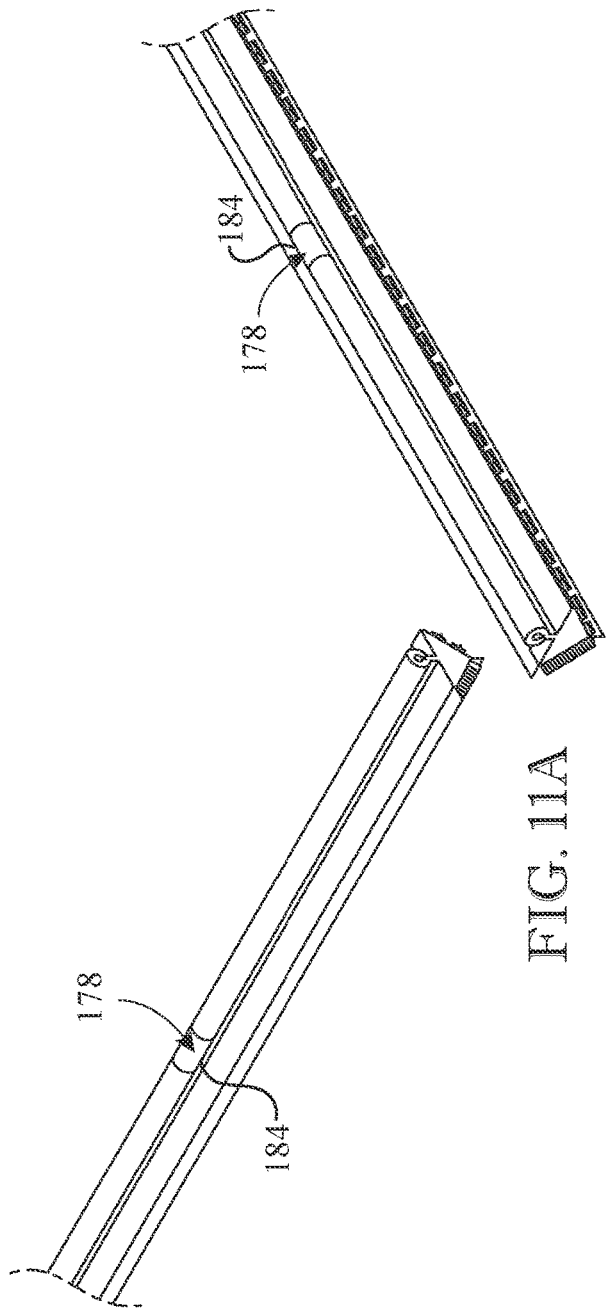
FIG. 11A provides a top left perspective view of the bottom section of the arm of the scrubbing device and a top right perspective view of the bottom section of the arm of the scrubbing device.
Figure 11D:
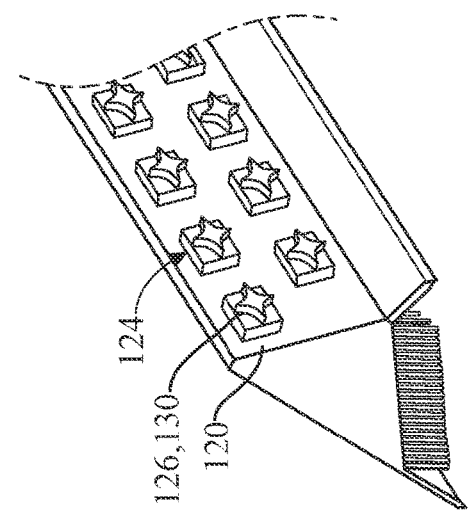
FIG. 11D provides a bottom right perspective view of an alternative embodiment of the bottom section of the arm of the scrubbing device.
Figure 11C:
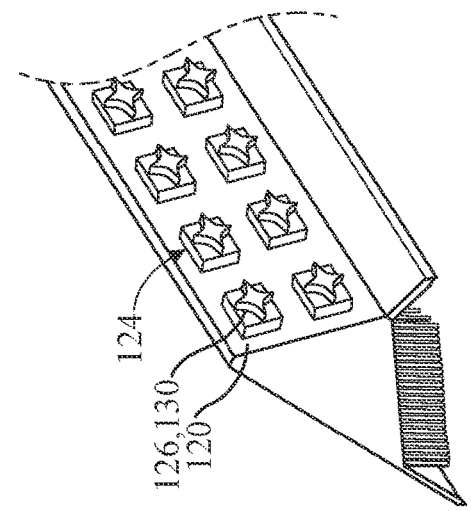
FIG. 11C provides a bottom right perspective view of the bottom section of the arm of the scrubbing device.
Figure 11B:
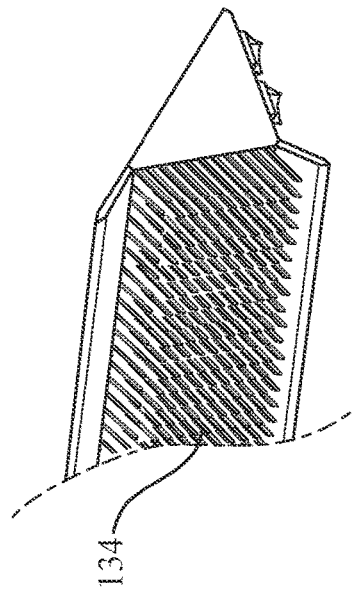
FIG. 11B provides a bottom left perspective view of the bottom section of the arm of the scrubbing device.
Figure 11E:
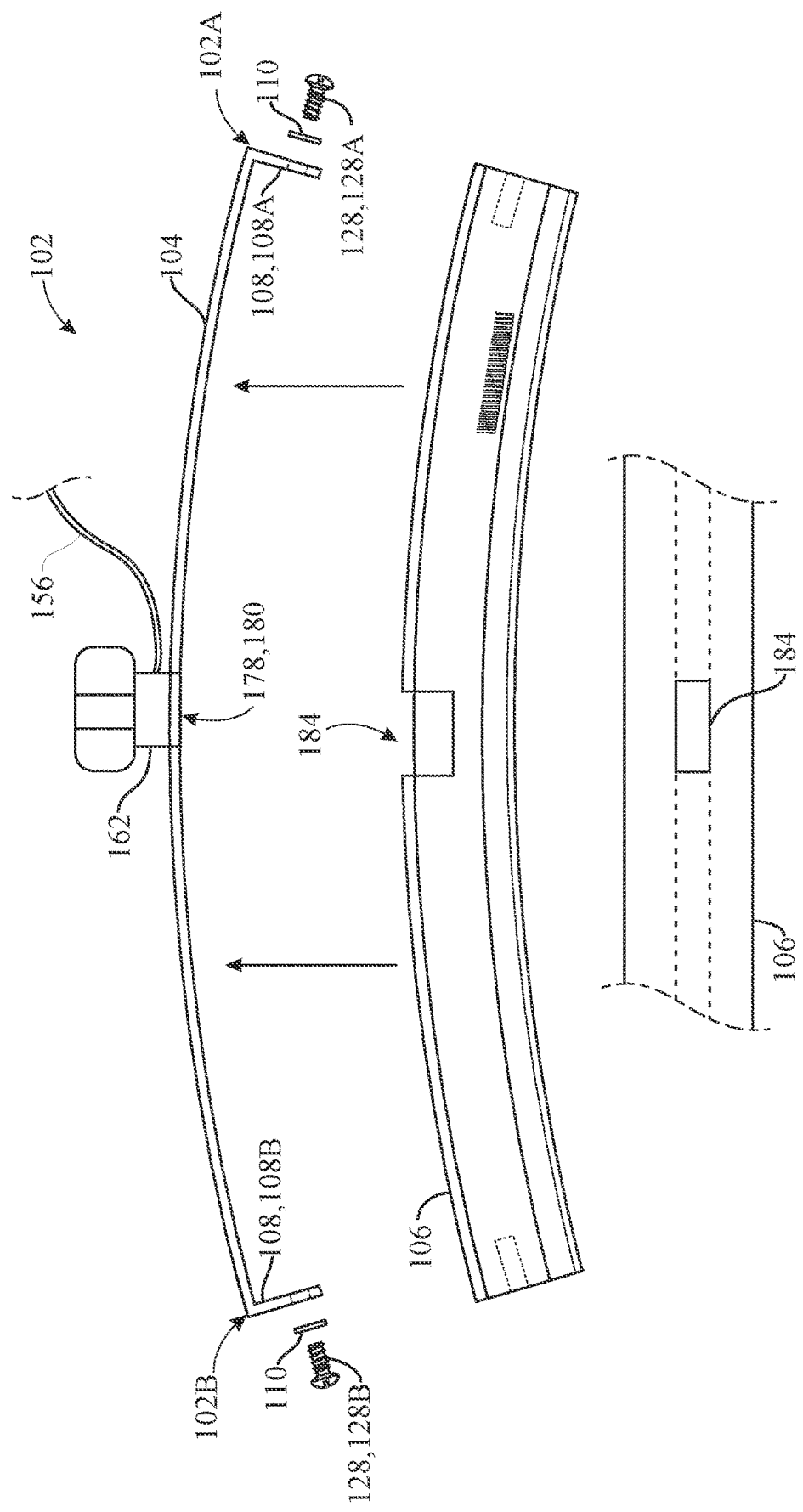
FIG. 11E provides an exploded view of the device, and a top view of the bottom section enlarged to show detail of the gear access.

As is best seen at FIG. 11E, in some embodiments, the arm 102 has an arm first end and 102A and an arm second end 102B. The device may comprise at least one joint 108. The at least one joint 108 may further comprise a first joint 108A configured to removably connect the top section 104 and the bottom section 106 at the arm first end 102A and a second joint 108B configured to removably connect the top section 104 and the bottom section 106 at the arm second end 102B. Though any suitable fixation means may be provided, in some embodiments, the joints 108 may removably connect the top section 104 and the bottom section 106 by a securement means comprising a washer 110 and a screw 128. In some embodiments, the first joint 108A may removably connect the top section 104 and the bottom section 106 of the arm 102 by first screw 128A, and the second joint 108B may removably connect the top section 104 and the bottom section 106 by a second screw 128B.

The arm 102 of the windshield wiper scrubbing device 100 may move in a first vertical direction and a second vertical direction, not shown. In some embodiments, and as shown below in FIG. 8, the first vertical direction may be upward. In other embodiments, the first vertical direction may be downward. In some embodiments, the second vertical direction may be upward. In other embodiments, the second vertical direction may be downward.

Figure 8:
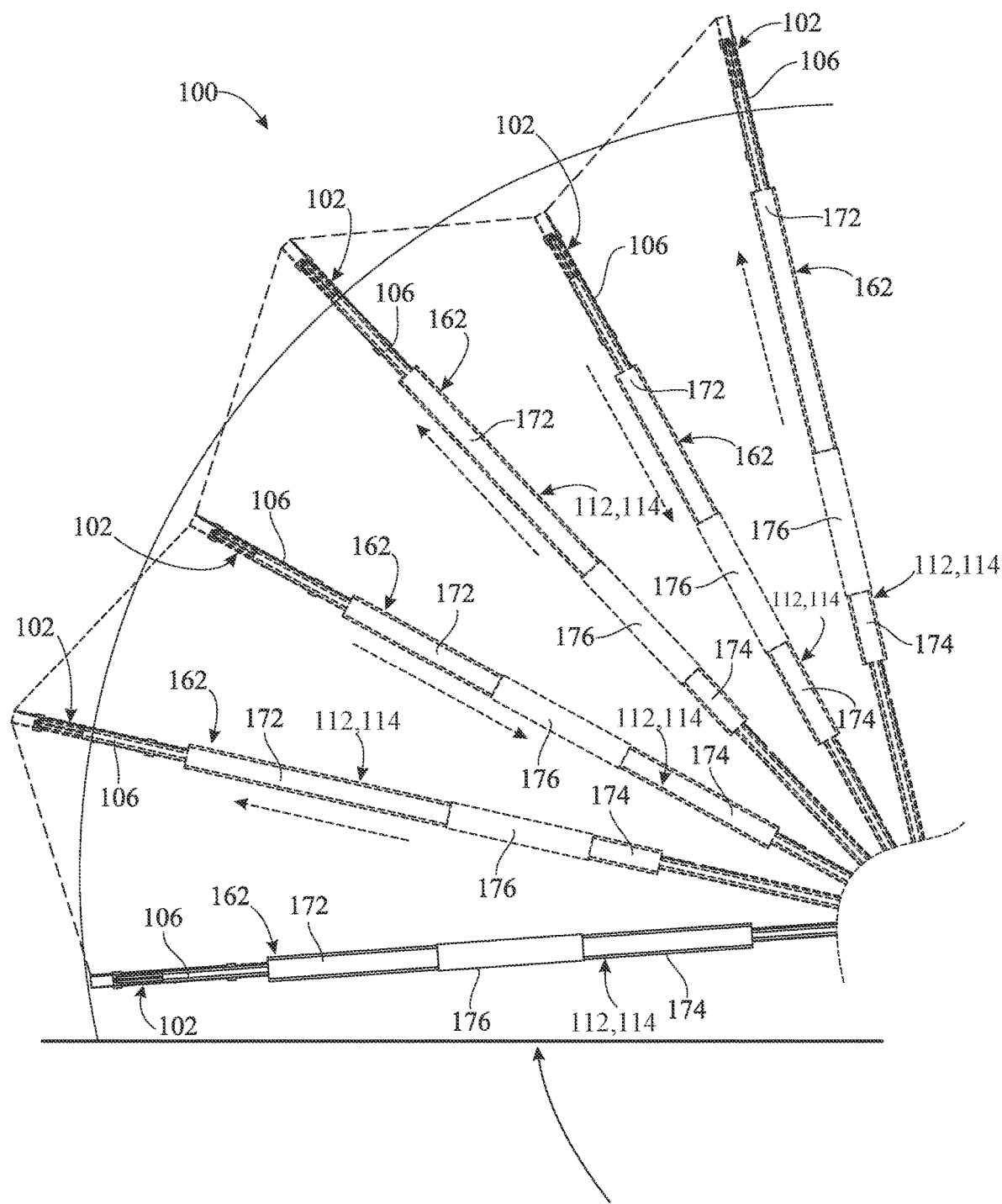
FIG. 8 is a view along line 8-8 of FIG. 3, enlarged to show detail, and providing a bottom view of the windshield wiper scrubbing device moving in the first rotational direction and the middle portion of the windshield wiper device moving in the first horizontal direction and the second horizontal direction, and shows the path or track followed by a windshield wiper of the device as it moves across the windshield.

FIG. 8 shows the path or track followed by a windshield wiper as it moves across the windshield.

A user may turn on the windshield wiper scrubbing device 100 in order to move the arm 102 in the first vertical direction and the second vertical direction. In some embodiments, the windshield wiper scrubbing device 100 may be turned on by depressing a button 136, in the vehicle, not shown. In other embodiments, the windshield wiper scrubbing device 100 may be turned on by turning a knob, not shown, in the vehicle, not shown, in a first direction. In another embodiment, the first direction to turn the knob, not shown, in the vehicle, not shown, may be upward. In further embodiments, the first direction to turn the knob, not shown, in the vehicle, not shown, may be downward.

A scrubbing rod 112 may comprise a scrubbing pad 114, a first edge 116, a second edge 118, a scraper 120 and a first motor 122 (also referred to as a primary motor 122). The second edge 118 is configured to provide a second blade that is able to remove and squeegee washer fluid from the windshield. The first edge 116 and the second edge 118 also serve to provide a blade on both sides of the bristles to keep the windshield free of debris while the wiper arm moves up and down.

Figure 4A:
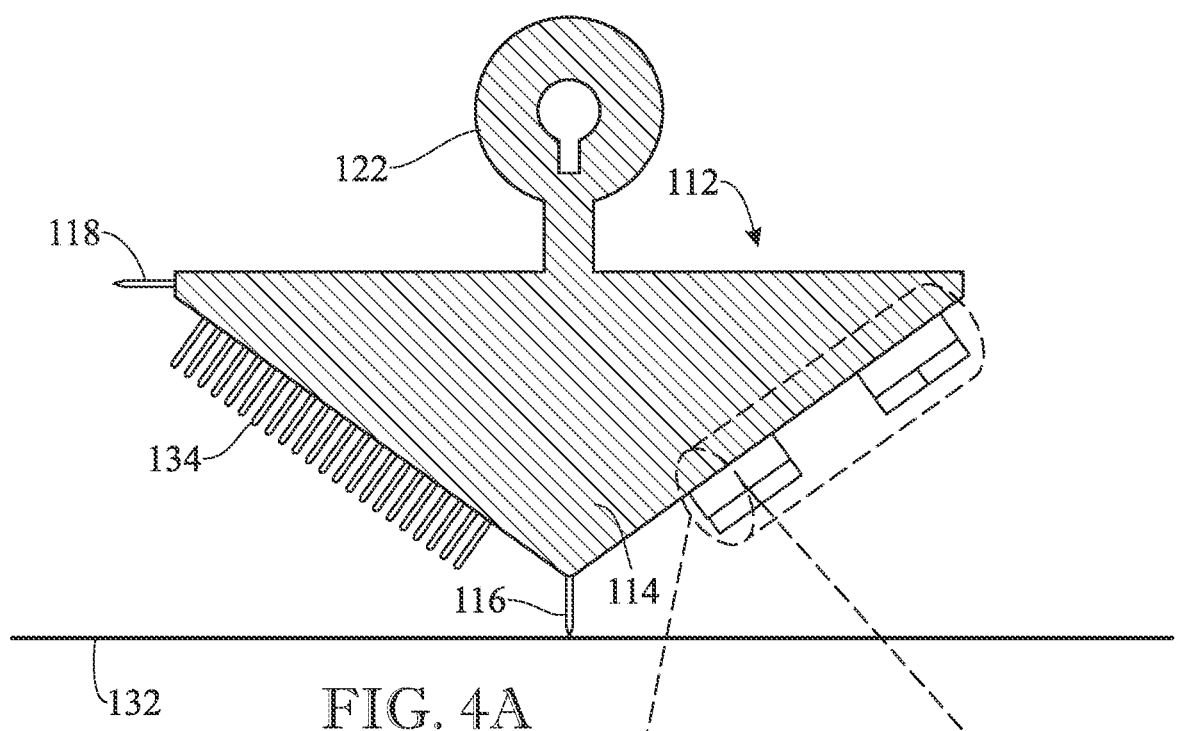
FIG. 4A presents an isometric view of the windshield wiper scrubbing device at rest.
Figure 4B:
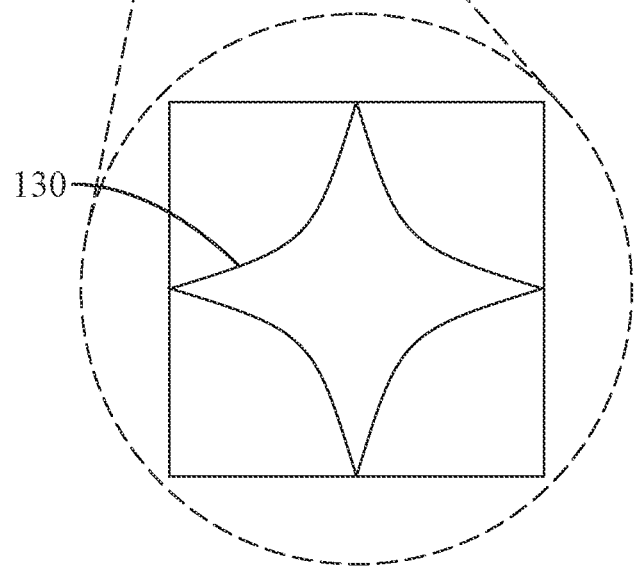
FIG. 4B presents a close-up view of the ice scraper.
Figure 5:
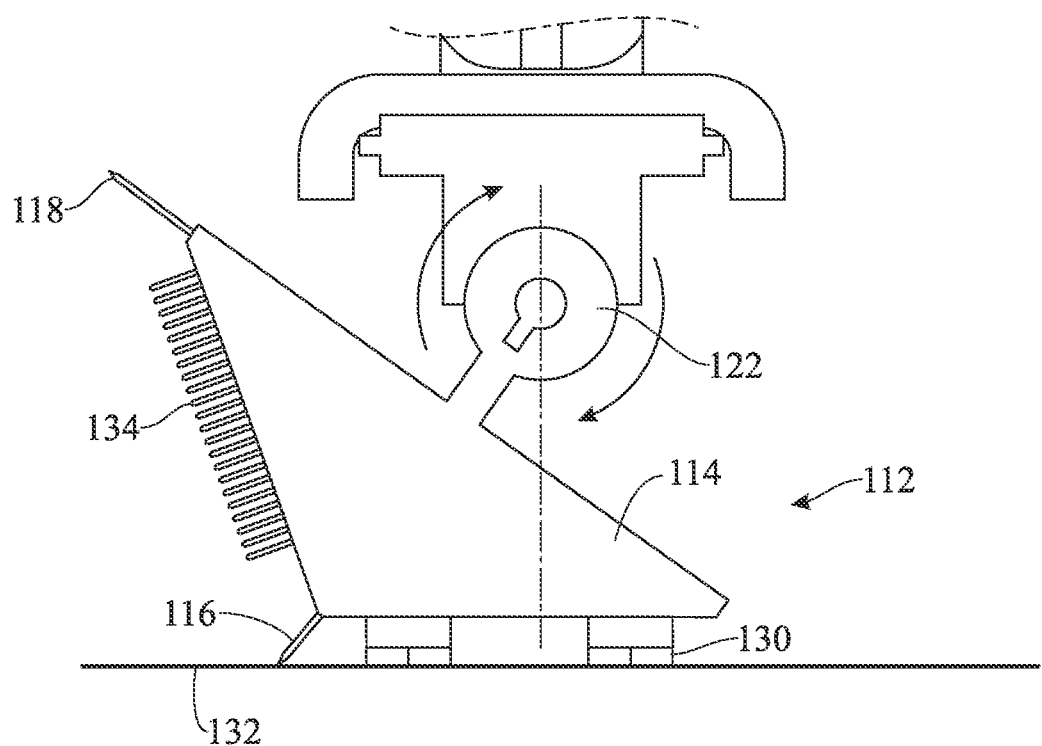
FIG. 5 presents an isometric view of the windshield wiper device after completing a second rotation, more particularly illustrating the ice scraper contacting the windshield.
Figure 6A:
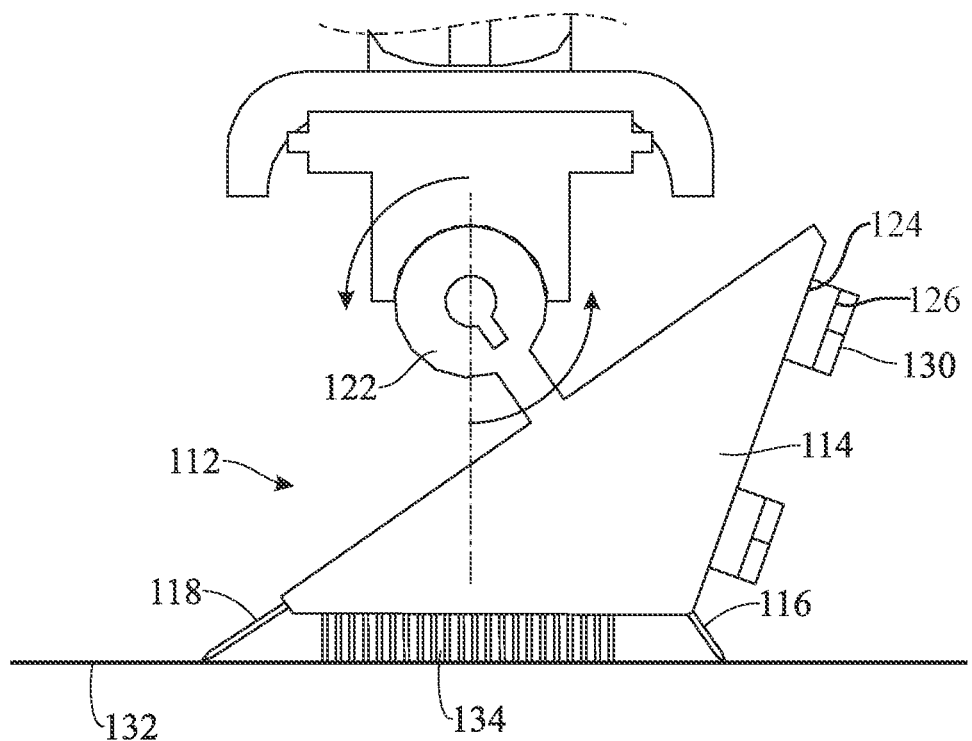
FIG. 6A presents an isometric view of the windshield wiper device after completing a first rotation, more particularly illustrating the bristles of the scrubbing pad contacting the windshield.

The scrubbing pad 114 may be made of a material comprising mesh, nylon, polyester, variations thereof, or combinations thereof. The scraper 120 may be made of a material comprising plastic, acrylic, molded plastic, metal, variations thereof, or combinations thereof. The scraper 120 may comprise a back face 124 adjacent to the scrubbing pad and a front face 126, best seen FIGS. 6A, and 11C-D. The front face 126 of the scraper 120 may comprise one or more protrusions 130, that may contact the windshield 132, as shown at FIGS. 5-6. The at least one protrusion 130 of the front face 126 of the scraper 120 may have a shape comprising a four-pointed star, as shown at FIG. 4B. Further, as shown at FIGS. 11C and 11D, variations or combinations of protrusions 130 may be provided. A plurality of protrusions 130 may be provided in one or more rows as shown at FIG. 11C. As shown at FIG. 11D, the protrusions 130 may be offset to prevent buildup of any substance present such as dirt, mud, ice, snow, or variations or combinations thereof, after removal of such substance from windshield by the device.

In some embodiments, and as shown in FIGS. 2 and 4A-6C, the scrubbing pad 114 may comprise bristles 134. The bristles 134 may be made of a material comprising wire, nylon, polyester, variations thereof, or combinations thereof. The bristles 134 may scrub the windshield 132 with the scrubbing pad 114. As seen below in FIG. 6A, the bristles 134 of the scrubbing pad 114 may be placed directly onto the windshield 132. As shown below in FIG. 4A, the scrubbing rod 112 may be placed in a resting position by placing the first edge 116 onto the windshield 132. The second edge 118 may be located on a top-leftmost end of the scrubbing rod 112 and the scraper 120 may be located on a top-rightmost end of the scrubbing rod 112.

Figure 6B:
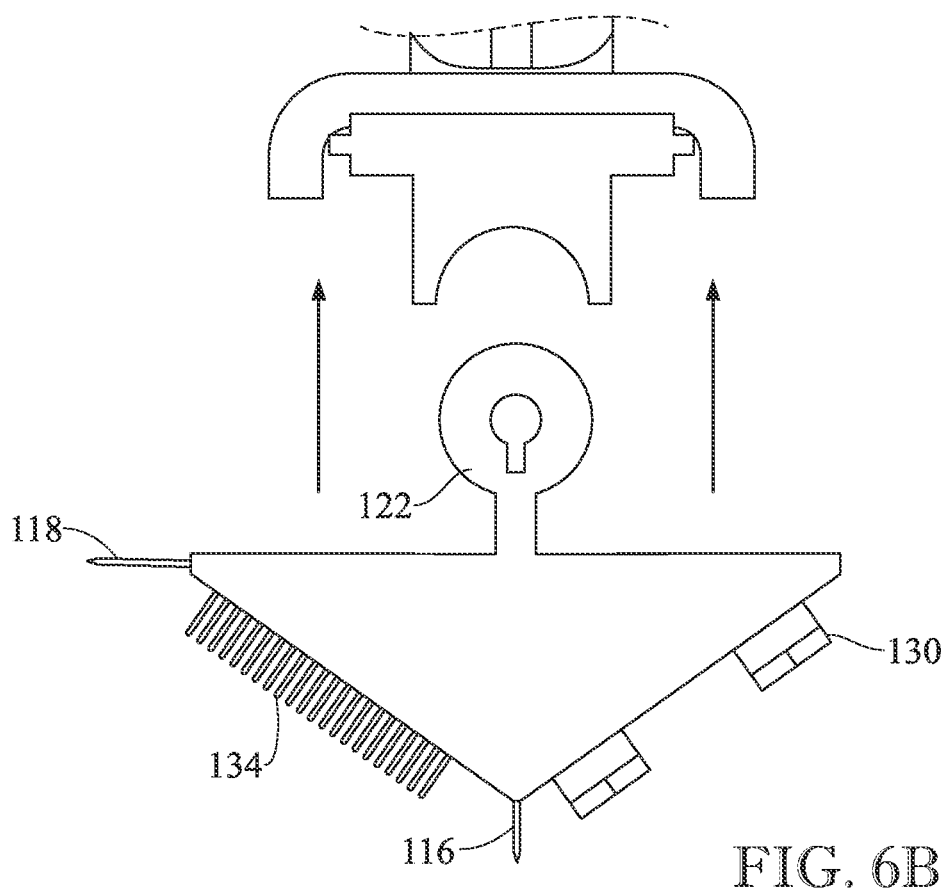
FIG. 6B presents an isometric view of the scrubbing rod of the windshield wiper device being removably installed on the top section of the arm thereof.
Figure 6C:
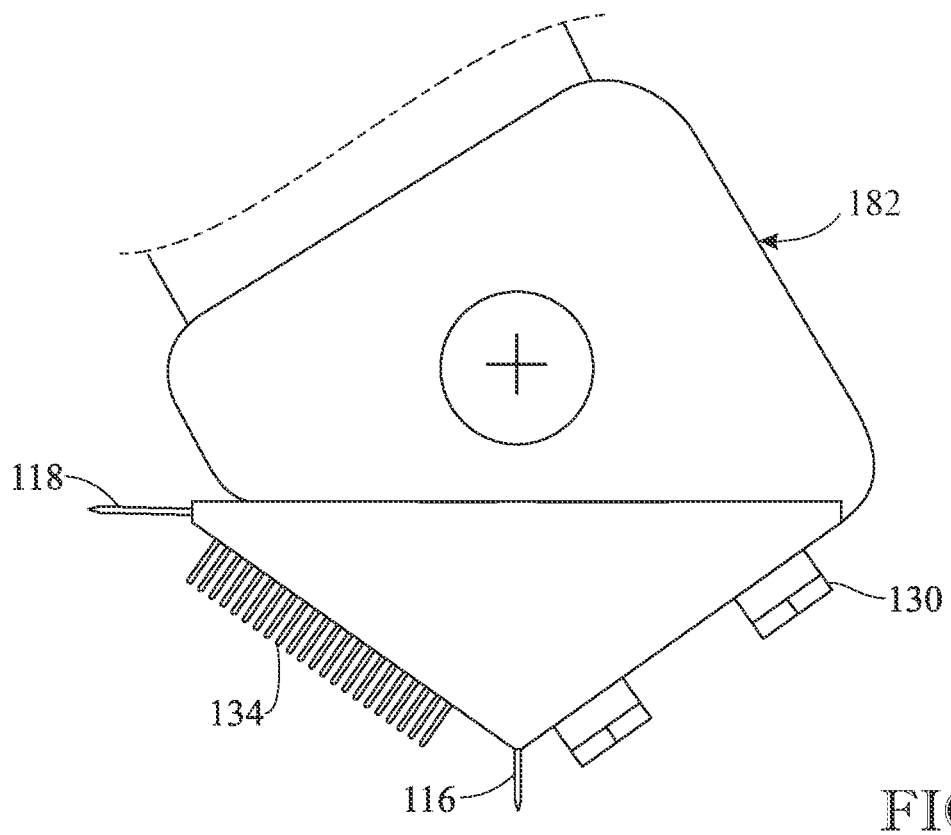
FIG. 6C presents an isometric view of an embodiment which includes an aerodynamic cap affixed over the top section of the arm thereof.
Figure 7:
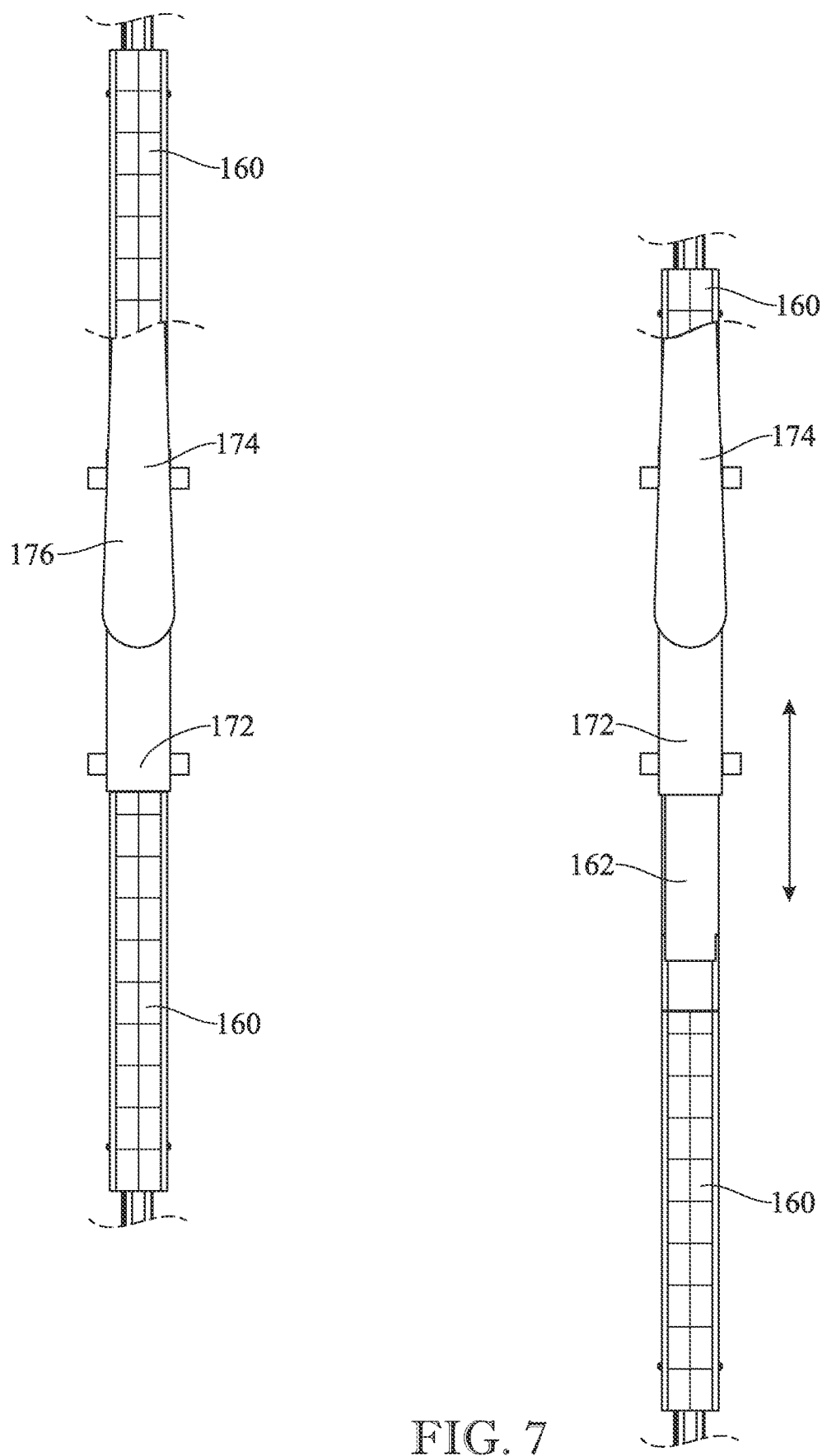
FIG. 7 is a side view of the windshield wiper scrubbing device, particularly illustrating the scrubbing pad extending from the holding pattern.

FIG. 6B shows the scrubbing rod 112 of the windshield wiper device 100 being removably installed on the top section 104 of the arm 102 thereof. As shown at FIG. 6C, in some embodiments, the device 100 includes an aerodynamic cap 182 affixed over the top section 104 of the arm 102.

Figure 12A:
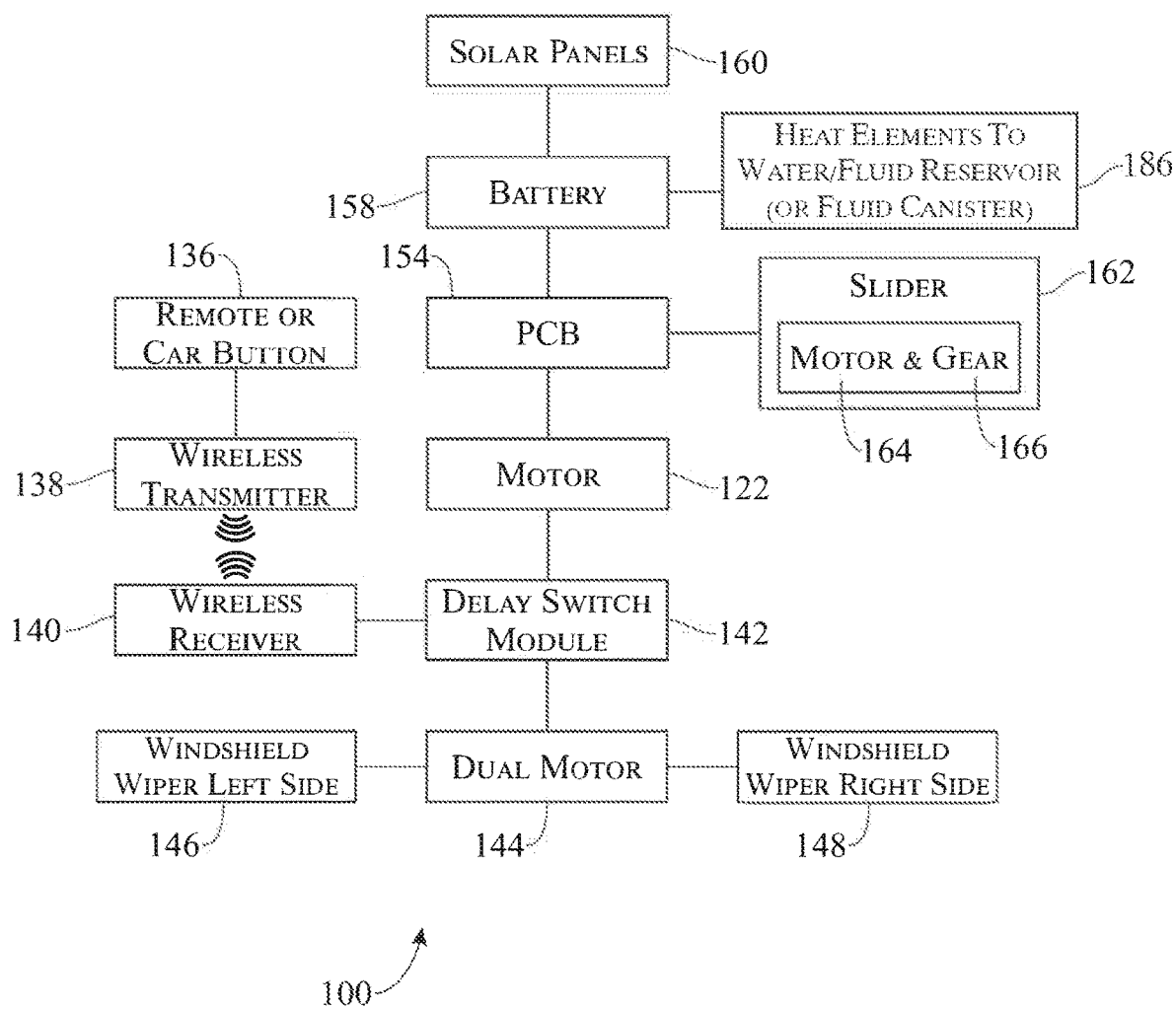
FIG. 12A is a flow chart of an embodiment of the windshield wiper device, particularly illustrating the solar panels powering the battery.

Referring now to FIG. 12A, a button or switch 136 may be depressed in order to actuate the windshield wiper scrubbing device 100. In some embodiments, the switch 136 may comprise a remote controller, not shown. In other embodiments, the switch 136 may comprise a button inside the vehicle that the user may push, not shown. Upon actuation, the switch 136 may send a signal from a wireless transmitter 138 to a wireless receiver 140. The wireless receiver 140 may receive the signal and can activate a delay control module 142, shown below in FIG. 12A. The delay control module 142 may cause a liquid canister, not shown, to release a cleaning solution, not shown, onto the windshield 132. The delay control module 142 may prevent the first motor 122 from turning on and rotating until the windshield 132 can receive the cleaning solution, not shown. In some embodiments, the delay control module 142 may prevent a dual motor 144, shown below in FIG. 11, from turning on a first arm 146 and a second arm 148. In further embodiments, and as shown below in FIG. 11, the first arm 146 may be located on a left side of the windshield 132, not shown, and the second arm 148 may be located on a right side of the windshield 132, not shown. In other embodiments, the first arm 146 may be located on the right side of the windshield 132, not shown, and the second arm 148 may be located on the left side of the windshield 132, not shown.

As shown below in FIG. 12A, the first (or primary) motor 122 may actuate after the liquid canister, also referred to as water/fluid reservoir, may dispense the cleaning solution (shown at 186), and the delay control module 142 may turn off. Upon actuation, the first motor 122 may position the scrubbing rod 112 in a first position 150 and may make a first rotation by placing the scrubbing pad 114 on the windshield 132, as shown below in FIG. 6A. The first edge 116 of the scrubbing rod 112 may contact the windshield 132 at an angle comprising a range of up to 89°, as shown below in FIG. 6A. The second edge 118 of the scrubbing rod 112 may be positioned at the angle of the first edge 116, shown below in FIG. 6A. The first motor 122 may make the first rotation by moving in a first rotational direction. In some embodiments, and as shown in FIG. 6A, the first rotational direction can be counterclockwise. In other embodiments, the first rotational direction can be clockwise. The switch 136, shown below in FIG. 12A, can be depressed a second time. Depressing the switch 136 the second time may cause the first motor 122 to position the scraper 120 in a second position 152 and may cause the first motor 122 to make a second rotation by placing the scraper 120 on the windshield 132, as shown below in FIG. 5. The first motor 122 may make the second rotation by moving in a second rotational direction. In some embodiments, and as shown below in FIG. 5, the second rotational direction can be clockwise. In other embodiments, the second rotational direction can be counterclockwise. In some embodiments, and as shown below in FIG. 9, the first rotational direction and the second rotational direction of the first motor 122 may rotate in the same direction. As shown below in FIG. 5, the first edge 116 and the second edge 118 of the scrubbing rod 112 may be elevated when the scraper 120 is placed on the windshield 132. The second edge 118 of the scrubbing rod 112 can scrape ice off a windshield.

Figure 9:
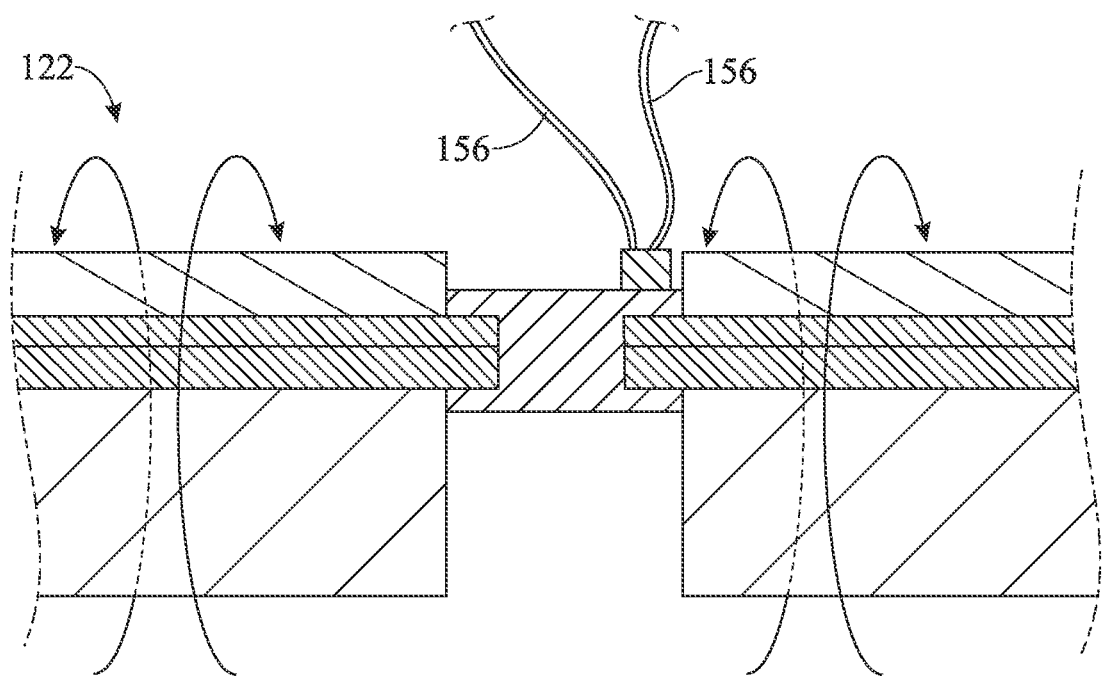
FIG. 9 is a view along line 9-9 of FIG. 3, enlarged to show detail, and providing a view of the first motor, particularly illustrating a first rotational direction and second rotational direction of the first motor.

Upon activation of the first motor 122, a printed circuit board 154, shown below in FIG. 12A, may electrically connect wires 156 located on the first motor 122, shown below in FIG. 9 and FIG. 11E, to a battery 158. The battery 158 may electrically power the first motor 122 through the printed circuit board 154 and the wires 156 that may connect the first motor 122 to the printed circuit board 154. In some embodiments, the battery 158 may connect to a remote fixed power supply, not shown, that may comprise an electrical outlet, a vehicle battery, combinations thereof, or variations thereof. In other embodiments, the battery may connect to a portable power supply, not shown, that may comprise a vehicle battery charger, variations thereof, or combinations thereof. In further embodiments, the battery may be electrically powered by the solar panels 160, shown below in FIGS. 3A-B, 7, and 12A. The solar panels 160 may be placed on the top section 104 of the arm 102 of the windshield wiper scrubbing device 100, shown below in FIGS. 3A-B, and 7.

Figure 12B:
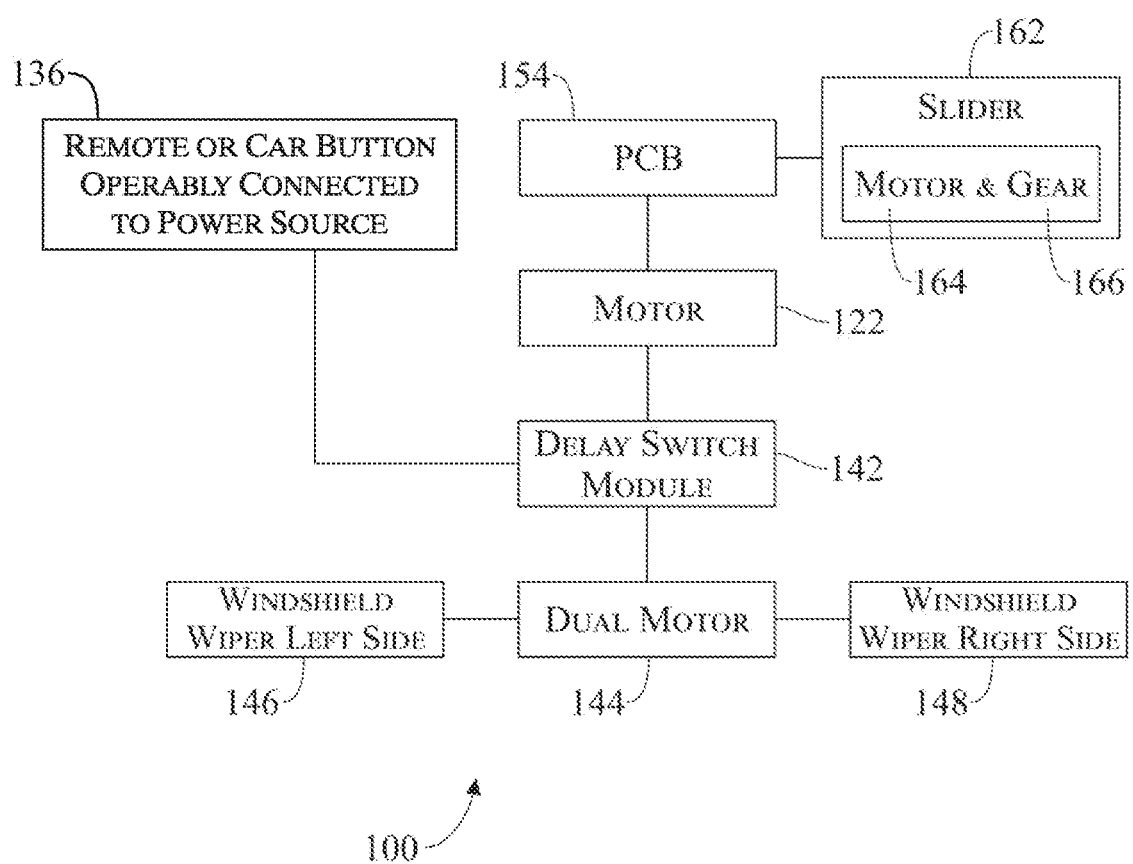
FIG. 12B is a flow chart of an embodiment of the windshield wiper device which includes a wired connection with the remote or car button which may be operably connected to a power source.

FIG. 12B shows an embodiment wherein the remote or car button 136 is wired to the delay switch module 142, and the remote or car button 136 is operably connected to and/or provides a power source, not shown.

Figure 12C:
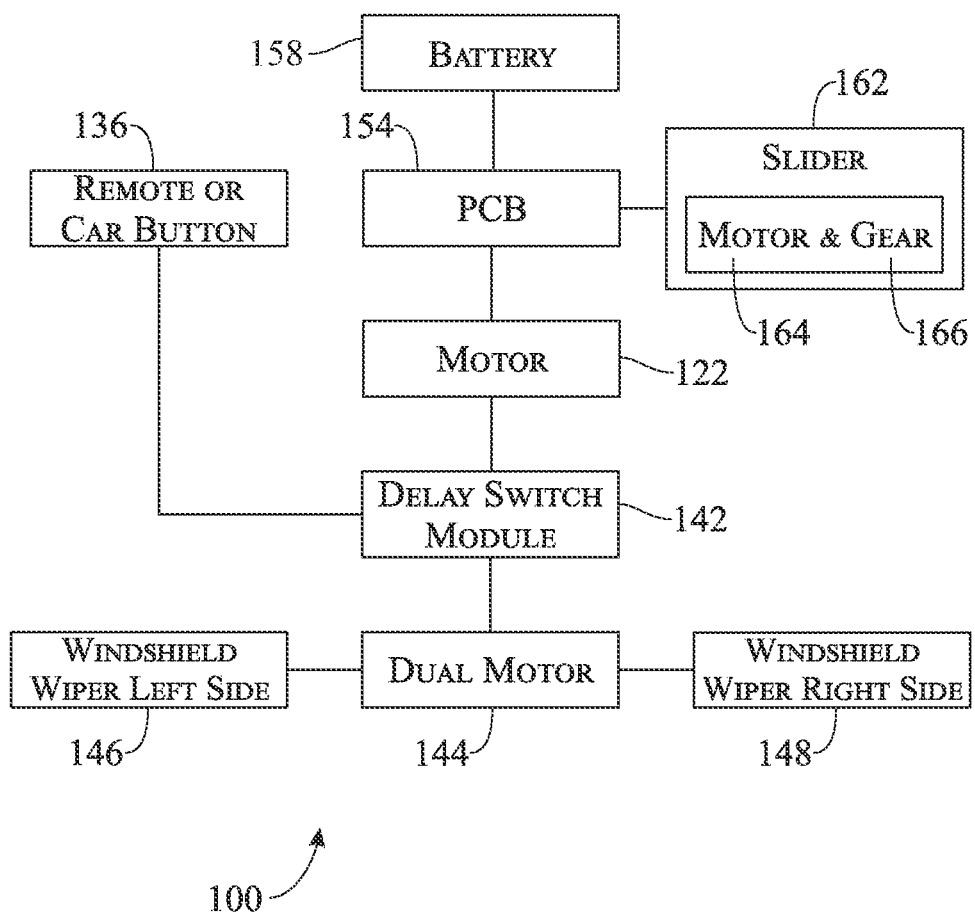
FIG. 12C is a flow chart of an embodiment of the windshield wiper device which includes a battery and has a wired connection between the remote or car button.

FIG. 12C shows an embodiment wherein a battery 158 is connected to the PCB 154, and the remote or car button 136 is wired to the delay switch module 142.

Figure 12D:
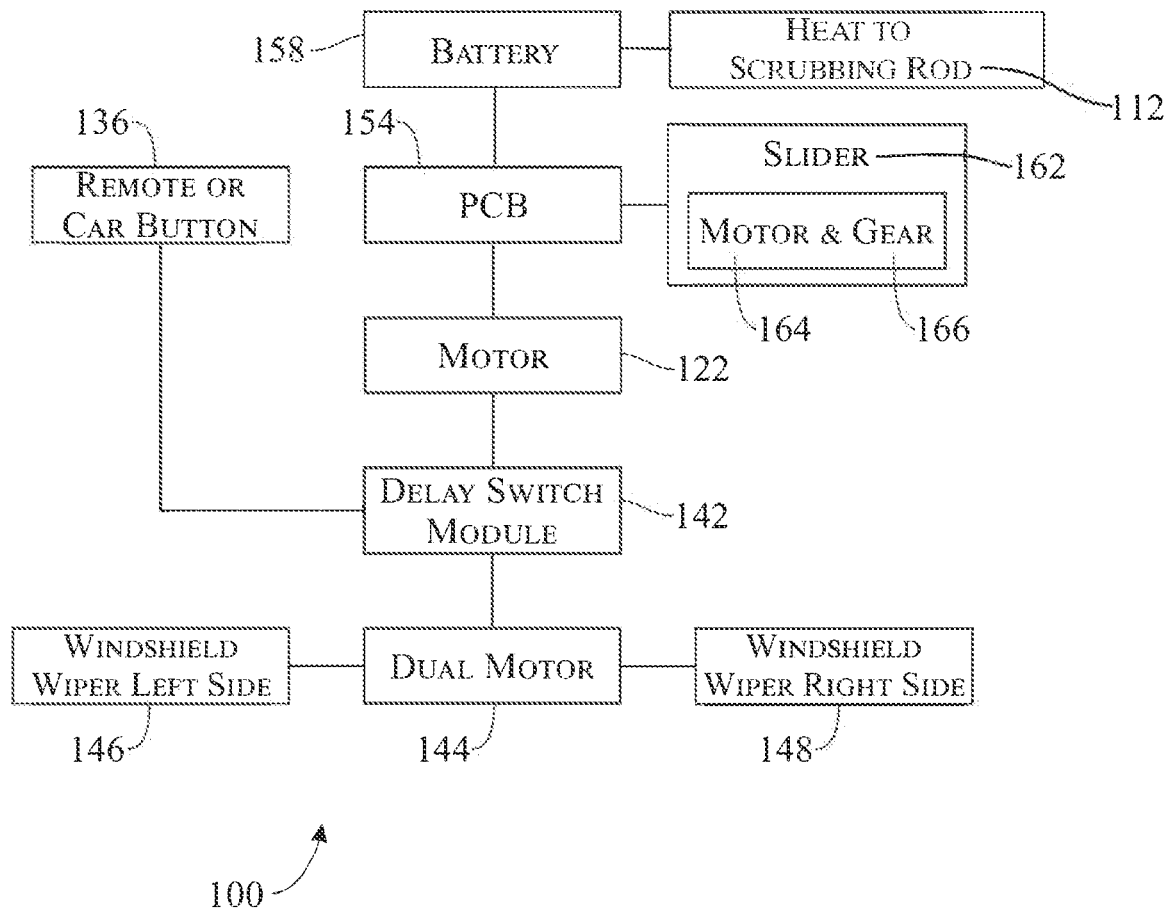
FIG. 12D is a flow chart of an embodiment of the windshield wiper device in which a battery provides a source of heat to the scrubbing rod.

FIG. 12D is a flow chart of an embodiment of the windshield wiper device in which a battery provides a source of heat to the scrubbing rod.

Figure 12E:
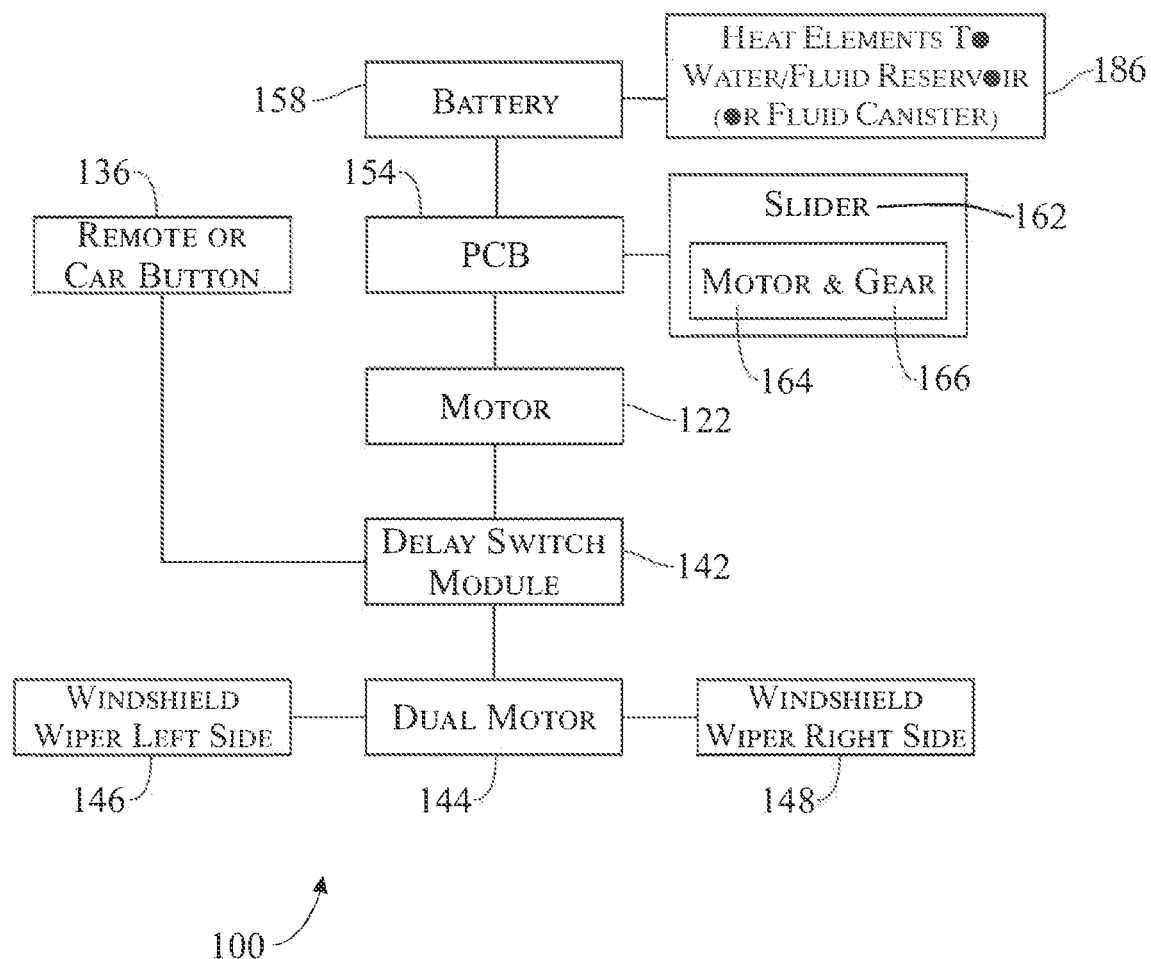
FIG. 12E is a flow chart of an embodiment of the windshield wiper device in which a battery powers heat elements to a water/fluid reservoir (or liquid canister) and includes a wired connection between the remote or car button.

FIG. 12E is a flow chart of an embodiment of the windshield wiper device in which a battery powers heat elements to a water/fluid reservoir (or liquid canister) 186. The heating element may heat the cleaning fluid to aid in removing bug debris, ice or snow or any solid substance present on the windshield of the vehicle, such as, for example without limitation, one or more of dirt, mud, ice, snow, variations thereof, or combinations thereof.

Figure 3A:
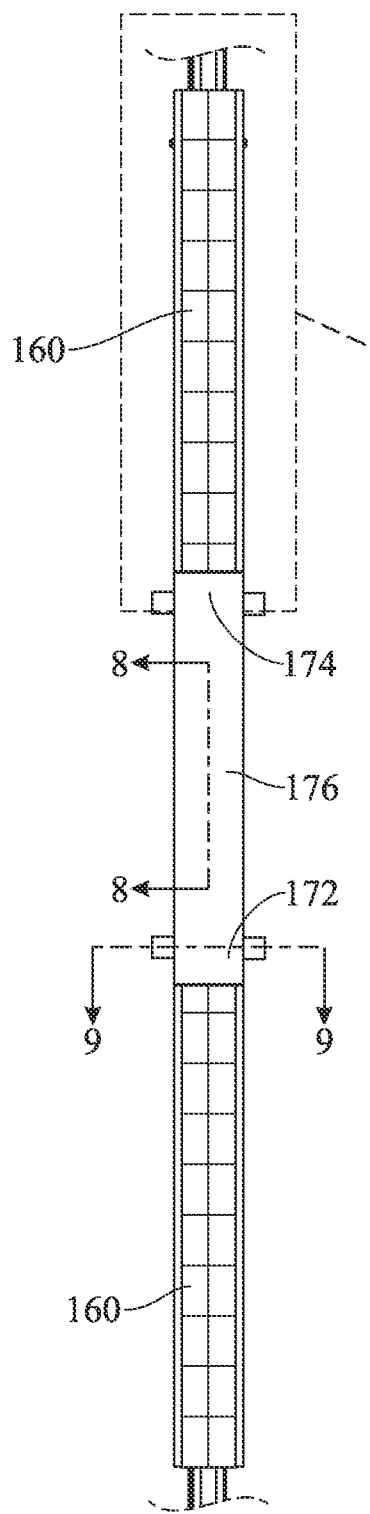
FIG. 3A presents a view of a middle portion of the windshield wiper scrubbing device of FIG. 1.
Figure 3B:
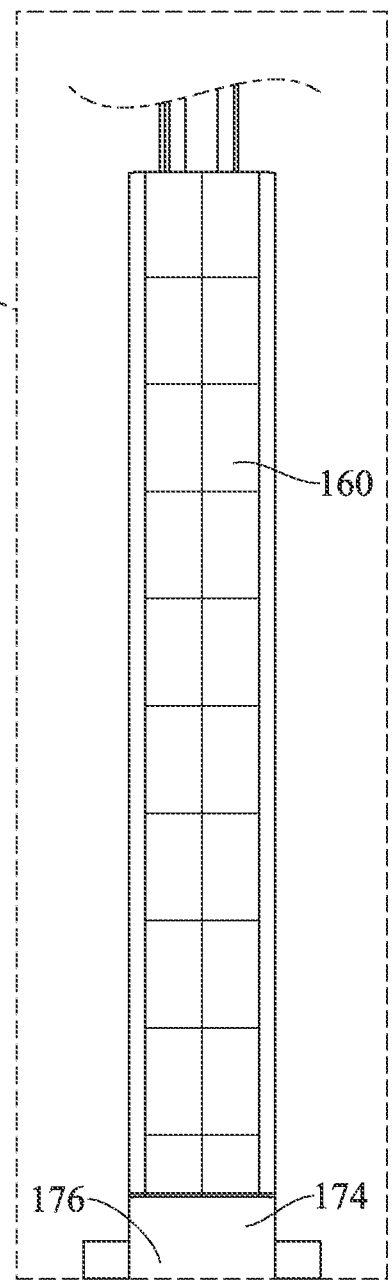
FIG. 3B presents a close-up view of an end of the middle portion of the windshield wiper scrubbing device of FIG. 3A.
Figure 3C:
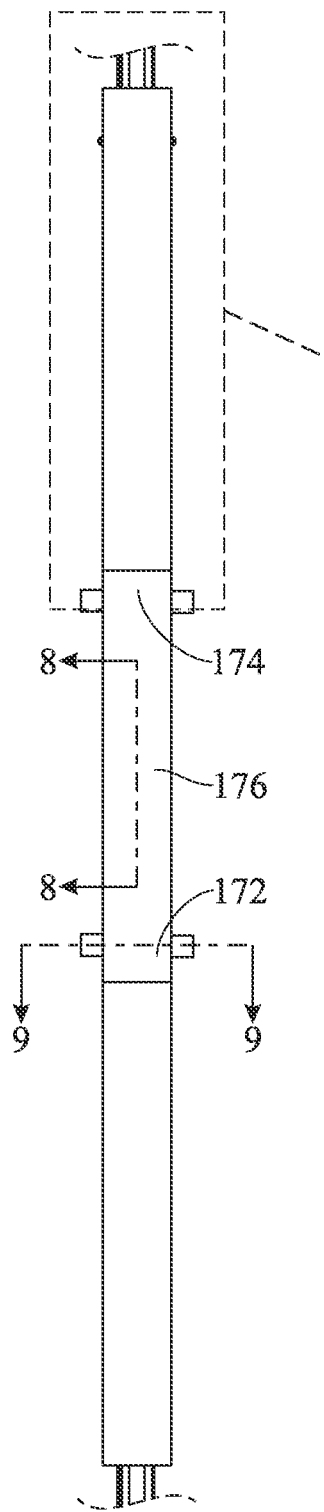
FIG. 3C presents a view of an alternative embodiment of a middle portion of the windshield wiper scrubbing device of FIG. 1.
Figure 3D:
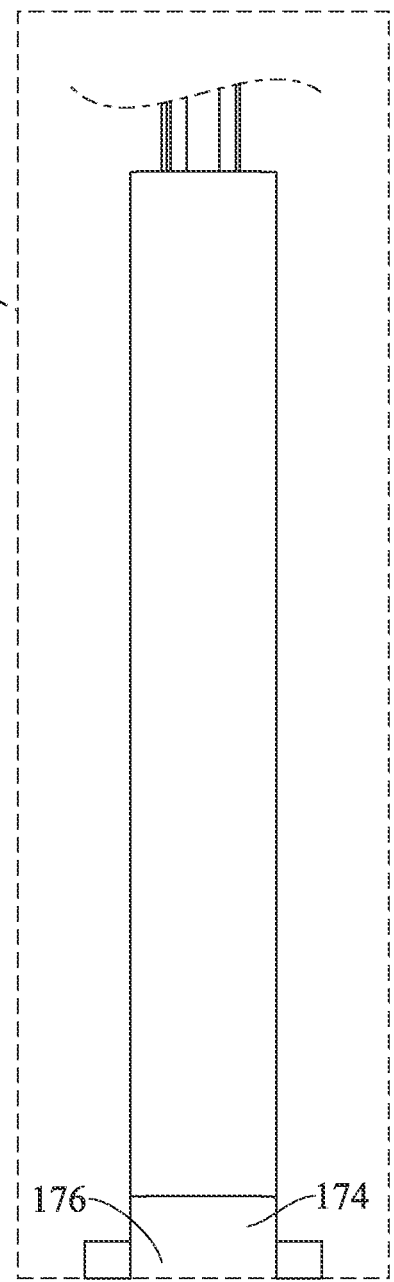
FIG. 3D presents a close-up view of an end of the middle portion of the windshield wiper scrubbing device of FIG. 3C.

An alternative embodiment of the middle portion of the windshield wiper scrubbing device which does not include solar panels is shown at FIG. 3C-3D. FIG. 3D presents a close-up view of an end of the middle portion of the windshield wiper scrubbing device of FIG. 3C. Though the middle portion of the windshield wiper scrubbing device shown at FIGS. 3C-3D does not include solar panels, it is like the middle portion shown at FIGS. 3A-B in other respects and has the same elements.

The battery 158 may be electrically wired to the scrubbing rod 112 and may transfer heat to the scrubbing rod 112. The heat that may be transferred to the scrubbing rod 112 from the battery 158 can increase a rate of removal of a semi-solid or solid substance found on the windshield 132 of the vehicle, not shown. The semi-solid or solid substance found on the windshield 132 of the vehicle, not shown, may comprise dirt, mud, ice, snow, variations thereof, or combinations thereof. In some embodiments, the solar panels 160 may heat the battery 158.

Figure 10:
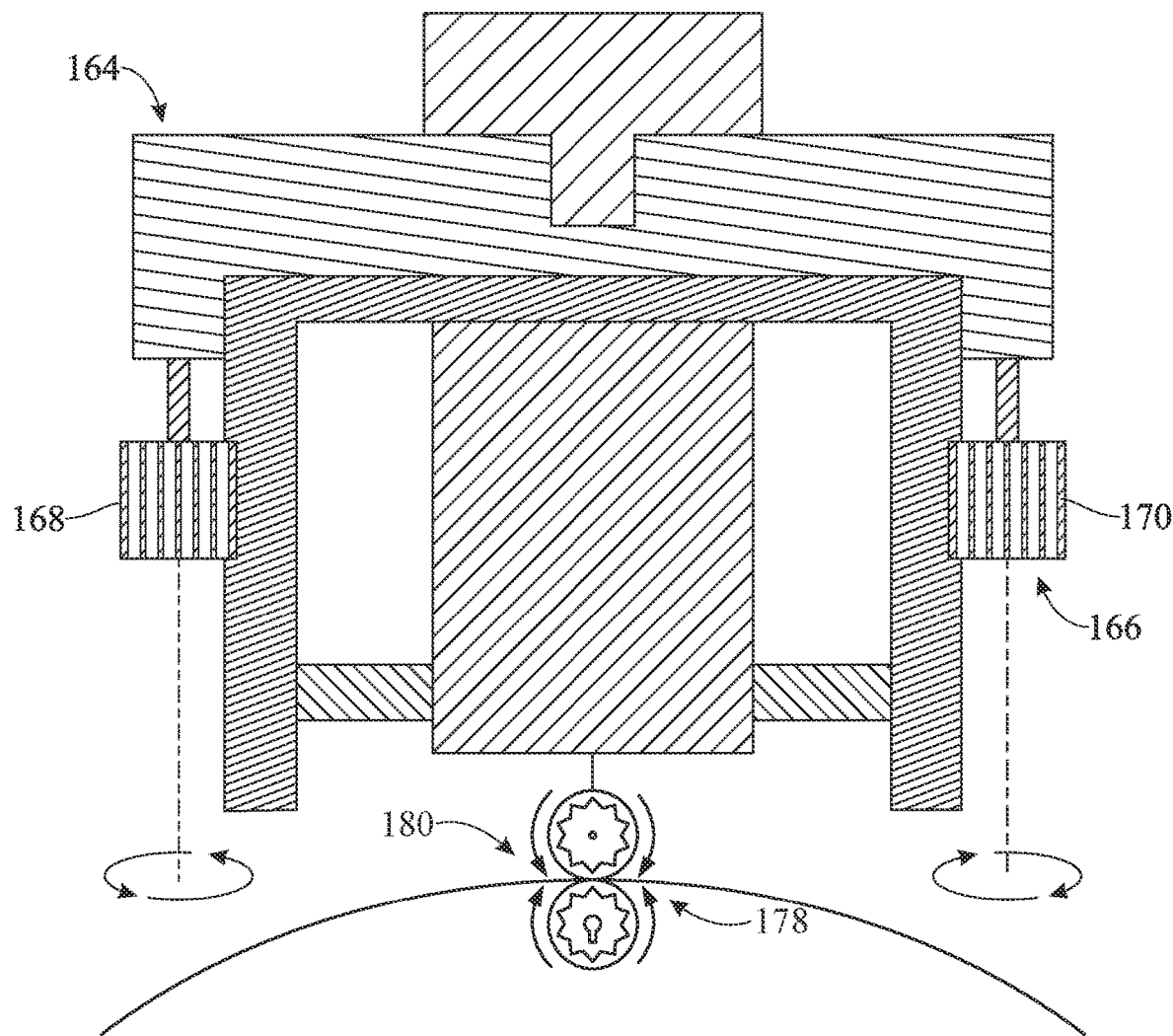
FIG. 10 is a perspective view of the second motor, particularly illustrating the first gear rotating in the first gear rotational direction and the second gear rotating in the second gear rotational direction.

The printed circuit board (PCB) 154, shown below in FIG. 12A-12E, may electrically connect the battery 158 to a slider 162. The slider 162 may comprise a second motor 164 (also referred to as a secondary motor 164) and at least two gears 166, as shown at FIG. 10 and discussed hereinbelow. The battery 158 may electrically power the second motor 164 through the printed circuit board 154 and wires 156 (which as noted herein may be of the type shown at FIG. 9 and FIG. 11E), that may connect the second motor 164 to the printed circuit board 154. The at least two gears 166 may be used to push the scrubbing rod 112 in a first horizontal direction and a second horizontal direction. In some embodiments, the first horizontal direction may be leftward, as shown below in FIG. 8. In other embodiments, the first horizontal direction may be rightward. In some embodiments, the second horizontal direction may be rightward, as shown below in FIG. 8. In other embodiments, the second horizontal direction may be leftward.

As shown below in FIG. 10, a motor is shown which makes the at least one wiper arm, or a plurality of wiper arms, move from side to side. A first gear 168 may rotate in a first gear rotational direction and a second gear 170 may rotate in a second gear rotational direction. In some embodiments, and as shown below in FIG. 10, the first gear rotational direction for the first gear 168 may be counterclockwise and the second gear rotational direction for the second gear 170 may be clockwise. In other embodiments, the first gear rotational direction for the first gear 168 may be clockwise and the second gear rotational direction for the second gear 170 may be counterclockwise. The first gear 168 that may rotate in the first gear rotational direction may move the slider 162 in the first horizontal direction. The second gear 170 that may rotate in the second gear rotational direction may move the slider 162 in the second horizontal direction. Also seen at FIG. 10, the arm 102 comprises a first arm gear 178 and a second arm gear 180 which are configured to translate the operation of the motor to the bottom section 106 and the top section 104 of the arm 102. FIG. 11A shows the location of the first arm gear 178 in the gear access 184 in the bottom section 106 of the arm 102. Further, as shown at FIG. 11E, the gear access 184 of the bottom section 106 is configured to receive one or more of the first and second arm gears 178,180 for operation of the device 100 and movement of the arm 102. In some embodiments, the gear access 184 may provide access to rotate between scrub features of the device 100.

As shown below in FIG. 8, the arm 102 of the windshield wiper scrubbing device 100 may move in the first vertical direction or the second vertical direction, not shown, while the slider 162 may move a leftmost end 172 of the scrubbing rod 112 and a rightmost end 174 of the scrubbing rod 112 in the first horizontal direction or the second horizontal direction. The windshield wiper scrubbing device 100 may clean the windshield 132 and may have a shaped scrubbing pattern. The shaped scrubbing pattern may be caused by simultaneous movement of the arm 102 of the windshield wiper scrubbing device 100 and the slider 162. The shaped scrubbing pattern may comprise a circular shape, a semicircular shape, variations thereof, or combinations thereof. As shown below in FIGS. 7 and 8, the slider 162 and scrubbing rod 112 may start in a stationary position 176. When the second motor 164 and the at least two gears 166 are turned on by the battery 158, the slider 162 and the scrubbing rod 112 may move in the first horizontal direction, shown below in FIGS. 7 and 8, or the second horizontal direction, shown below in FIG. 8.

The user may power down the slider 162 and the arm 102 of the windshield wiper scrubbing device 100 by turning off the windshield wiper scrubbing device 100. In some embodiments, the windshield wiper scrubbing device 100 may be turned off by depressing the button, not shown, in the vehicle, not shown. In other embodiments, the windshield wiper scrubbing device 100 may be turned off by turning the knob, not shown, located in the vehicle, not shown, in a second direction. In another embodiment, the second direction to turn the knob, not shown, located in the vehicle, not shown, may be upward. In further embodiments, the second direction to turn the knob, not shown, located in the vehicle, not shown, may be downward.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A windshield wiper scrubbing device for cleaning a windshield of a vehicle, the windshield wiper scrubbing device comprising:
   at least one arm constructed and arranged for movement in a first vertical direction and a second vertical direction, the at least one arm comprising a top section and a bottom section, wherein the bottom section of the at least one arm further comprises a scrubbing rod operably connected to a secondary motor and at least one gear, the scrubbing rod being capable of movement in a first horizontal direction and a second horizontal direction in response to the operation of the secondary motor and the at least one gear;
   a liquid canister releasing cleaning solution onto the windshield upon a first actuation of a switch;
   a scrubbing pad located on the scrubbing rod that is placed onto the windshield through a first rotation in a first rotational direction after the windshield receives the cleaning solution, wherein the scrubbing pad is placed onto the windshield in a first position through the first rotation;
   a scraper located on the bottom section of the arm that is placed onto the windshield through a second rotation in a second rotational direction upon a second actuation of the switch, wherein the scraper is placed onto the windshield in a second position through the second rotation; and
   a primary motor that rotates the scrubbing pad in the first rotational direction to place the scrubbing pad onto the windshield in the first position, and rotates the scrubbing pad in the second rotational direction to place the scraper onto the windshield in the second position.

2. The windshield wiper scrubbing device of claim 1 further comprising at least one joint configured to removably connect the top section and the bottom section of the at least one arm.

3. The windshield wiper scrubbing device of claim 2 wherein the at least one arm has an arm first end and an arm second end, and the at least one joint comprises a first joint configured to removably connect the top section and the bottom section at the arm first end and a second joint configured to removably connect the top section and the bottom section at the arm second end.

4. The windshield wiper scrubbing device of claim 3 wherein the at least one joint is configured to removably connect the top section and the bottom section by at least one screw and at least one washer.

5. The windshield wiper scrubbing device of claim 1 wherein the first vertical direction is upward and the second vertical direction is downward.

6. The windshield wiper scrubbing device of claim 1 wherein the first vertical direction is downward and the second vertical direction is upward.

7. The windshield wiper scrubbing device of claim 1 capable of use by a user, and configured to enable the user to turn on the windshield wiper scrubbing device in order to move the at least one arm in the first vertical direction and the second vertical direction.

8. The windshield wiper scrubbing device of claim 7 configured to be turned on by depressing a button in the vehicle.

9. The windshield wiper scrubbing device of claim 7 configured to be turned on by turning a knob in the vehicle.

10. The windshield wiper scrubbing device of claim 1 wherein the scrubbing rod comprises the scrubbing pad, the scraper and the primary motor, and the scrubbing rod further comprises a first edge, and a second edge.

11. The windshield wiper scrubbing device of claim 10 wherein the scraper comprises a scraper front face, the scraper front face further comprising at least one protrusion configured to contact the windshield.

12. The windshield wiper scrubbing device of claim 11 wherein the at least one protrusion has a shape comprising a four-pointed star.

13. The windshield wiper scrubbing device of claim 1 wherein the scrubbing pad comprises a plurality of bristles configured for scrubbing the windshield.

14. The windshield wiper scrubbing device of claim 1 wherein the switch may comprise one or more of a remote controller, or a button inside the vehicle.

15. The windshield wiper scrubbing device of claim 1 wherein the switch is configured to send a wireless signal from a wireless transmitter to a wireless receiver.

16. The windshield wiper scrubbing device of claim 15 further comprising a delay control module, and wherein the wireless receiver is configured to receive the wireless signal and activate the delay control module.

17. The windshield wiper scrubbing device of claim 16 wherein the delay control module is configured to prevent the primary motor from turning on and rotating until the windshield can receive the cleaning solution.

18. The windshield wiper scrubbing device of claim 17 wherein the delay control module is configured to turn off and to enable the primary motor to be actuated after the liquid canister dispenses the cleaning solution.

19. The windshield wiper scrubbing device of claim 16 further comprising a dual motor, wherein the at least one arm comprises a first arm and a second arm, and wherein the delay control module is configured to prevent the dual motor from turning on the first arm and the second arm.

20. The windshield wiper scrubbing device of claim 19 further comprising a printed circuit board and a battery, and wherein, upon activation of the primary motor, the printed circuit board is configured to electrically connect a plurality of wires located on the primary motor to the battery.

21. The windshield wiper scrubbing device of claim 20 wherein the battery is configured to electrically power the primary motor through the printed circuit board and the plurality of wires connecting the primary motor to the printed circuit board.

22. The windshield wiper scrubbing device of claim 21 wherein the battery may be operably connected to a fixed power supply that may comprise one or more of an electrical outlet, a vehicle battery, or combinations thereof.

23. The windshield wiper scrubbing device of claim 21 wherein the battery may be operably connected to a portable power supply that may comprise a vehicle battery charger.

24. The windshield wiper scrubbing device of claim 21 further comprising at least one solar panel configured to electrically power the device.

25. The windshield wiper scrubbing device of claim 21 wherein the battery is electrically powered by at least one solar panel.

26. The windshield wiper scrubbing device of claim 21 wherein the battery is electrically wired to the scrubbing rod and is configured to transfer heat to the scrubbing rod, whereby the transfer of heat from the battery to the scrubbing rod is capable of increasing a rate of removal of a one or more of a semi-solid substance and a solid substance present on the windshield of the vehicle.

27. The windshield wiper scrubbing device of claim 26 wherein the semi-solid substance and the solid substance present on the windshield of the vehicle may comprise one or more of dirt, mud, ice, snow, variations thereof, or combinations thereof.

28. The windshield wiper scrubbing device of claim 25 wherein the at least one solar panel is configured to heat the battery.

29. The windshield wiper scrubbing device of claim 21 further comprising a slider, and wherein the printed circuit board is configured to electrically connect the battery to the slider.

30. The windshield wiper scrubbing device of claim 29 wherein the slider comprises the secondary motor and the at least one gears, and the battery is configured to electrically power the secondary motor through the printed circuit board and a plurality of wires that connect the secondary motor to the printed circuit board.

* * * * *